Patented June 10, 1930

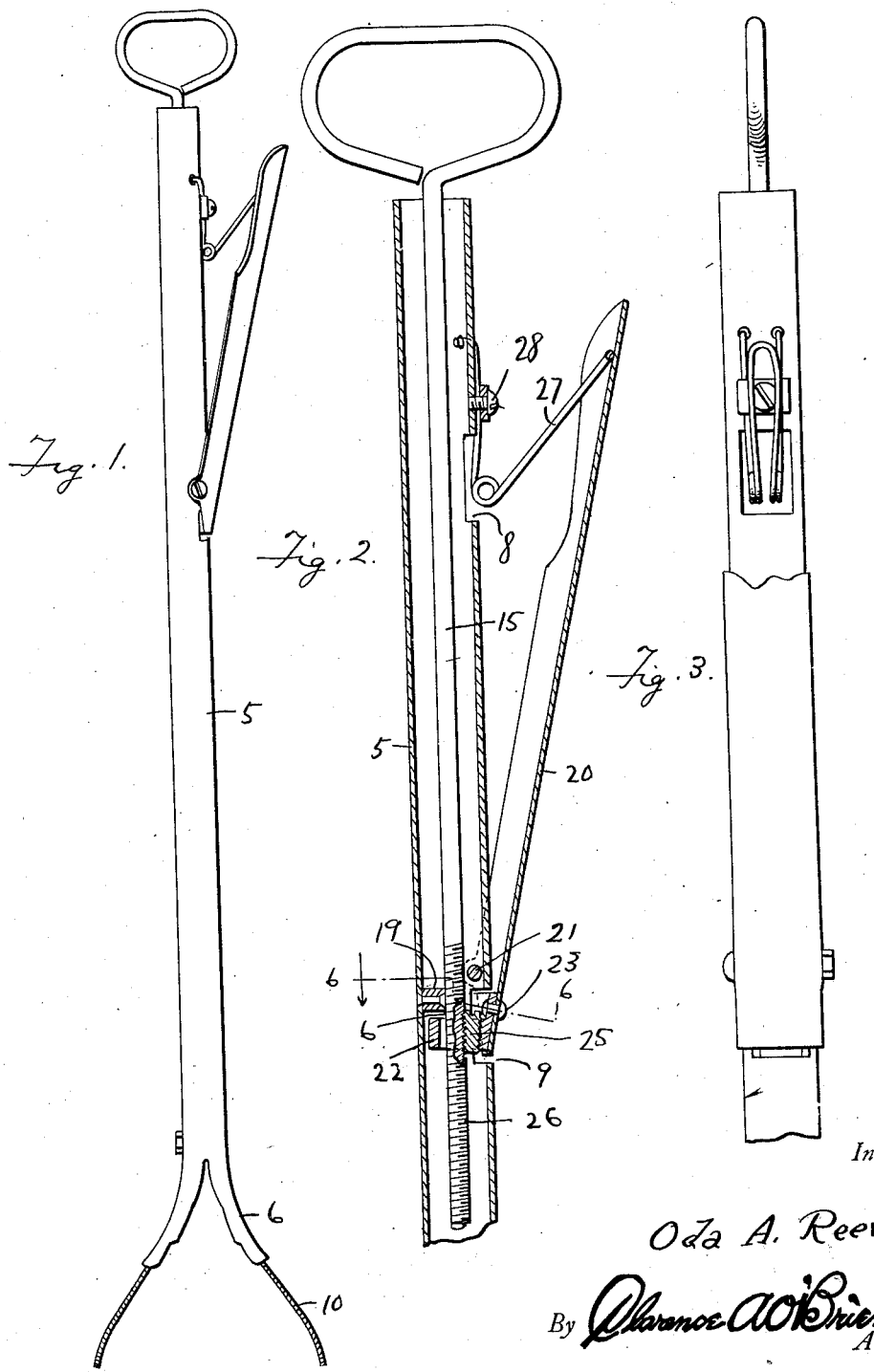

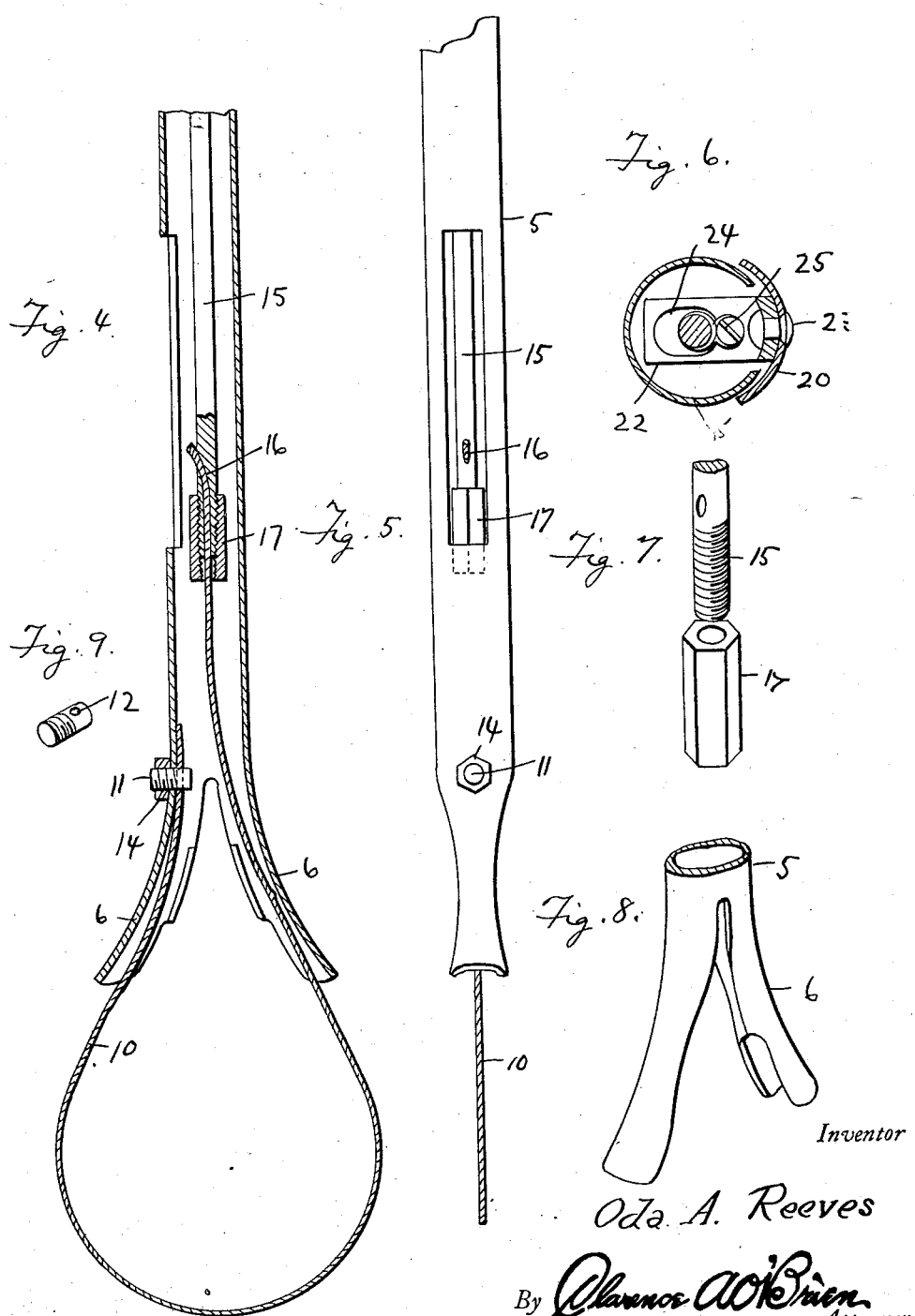

1,763,181

UNITED STATES PATENT OFFICE

ODA AUGUSTA REEVES, OF CHARLESTON, MISSOURI

ANIMAL HOLDER

Application filed June 6, 1928. Serial No. 283,379.

The present invention relates to an animal holder and has for its prime object to provide certain improvements upon the structure disclosed in my application, Serial No. 203,784, filed July 6, 1927.

Another very important object of the invention resides in the provision of efficient and reliable means for holding a rod in different adjusted positions within a tube, for the purpose of adjusting a loop in engagement with an animal.

Another very important object of the invention resides in the provision of improvements of this nature which are simple in their construction, easy to manipulate, and otherwise well adapted to the purpose for which they are designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the device embodying the features of my invention.

Figure 2 is a longitudinal section through the upper portion thereof.

Figure 3 is an elevation of the upper portion thereof looking at right angles to that shown in Figure 1, and showing a portion of the lever broken away.

Figure 4 is a longitudinal section through the lower end of the device.

Figure 5 is an elevation of the lower end of the device, taken at right angles to that shown in Figure 1, Figure 6 is a transverse section taken substantially on the line 6—6 of Figure 2.

Figure 7 is a perspective view of the lower end of the operating rod, showing the nut disassembled therefrom.

Figure 8 is a perspective view of the lower end of the tube, and

Figure 9 is a perspective view of the screw used to secure one end of the flexible member.

Referring to the drawing in detail, it will be seen that the numeral 5 denotes an elongated shoe which at its lower end is provided with a pair of diverging extensions 6 forming guides and being of the channel variety partially closed intermediate their ends. The tube is provided adjacent its other end with an opening 8 and intermediate its ends with an opening 9.

A flexible member, such as a wire or the like 10 is anchored in said one end of the tube by means of the screw 11, threaded into the tube and having an aperture 12 to receive one end of the flexible member and locked in place by means of the nut 14. This flexible member 10 is trained through one of the extensions 6, then looped, and then trained through the other extension 6, up into the tube, and is engaged with a rigid operating rod 15, by passing through an opening in one end thereof as is indicated at 16, and locked in place by a tapered nut 17. A block 19 is disposed in the tube 5, opposite the opening 9. A lever 20 is pivotally mounted as at 21, on the tube, immediately above the opening 9, and has an end extending down from the pivot 21, and merging into an extension 22, which is fixed thereto by means of rivets 23, or in any other suitable manner. The extension 22 is provided with an elongated opening 24, through which the operating rod 15 extends. A threaded element 25 is engaged in the extension 24, so that a portion projects into the oblong opening 24, so that threads of this threaded member 25 may engage threads 26 on the intermediate portion of the rod 15, for holding the rod in adjusted position. A spring 27 is anchored to the tube 5, adjacent the opening 8 by a means 28 and bears against the free end of the lever 22, so as to hold the extension 22 inwardly of the tube with the threaded member 25 engaged with the threaded portion 26 of the rod 15 and holds the rod 15 against the block 19, thereby preventing longitudinal movement of the rod through the tube, and holding the loop 10 about the animal. Obviously, the lever 20 may be rocked to release the rod so that the flexible member 10 may be tightened about the animal when desired.

It is thought that the construction, operation and advantages of this invention will now be quite apparent to those skilled in this art, without a more detailed description thereof. The present embodiment has been disclosed in detail, for the purposes of exemplification, since in actual practice it attains the features of advantage enumerated as desirable in the statement of the invention and the above description.

It will be apparent that changes in the details of construction and in the combination and arrangement of parts may be resorted to, without departing from the spirit or scope of the invention as hereinafter claimed or sacrificing any of its advantages.

Having thus described my invention, what I claim as new is:

1. An animal holder comprising a tube the lower end of said tube provided with oppositely disposed diverging guides, a wire anchored at one end of the tube to form a loop and then to extend in said end of the tube said loop seated in said guides, a rigid rod slidable through the tube, means at the inner end of the rod to anchor the other end of the wire thereto, a lever, means for rockably mounting the lever on the tube, said tube having an opening through which one end of the lever passes, said one end of the lever having an opening through which the rod extends, spring means resting against the lever to cause the said one end of the lever to be urged inwardly of the tube, said rod having a threaded portion, a threaded member engaged in said one end of the lever to partially extend into the opening thereof for engaging the threaded portion of the rod to hold said rod in different adjusted positions.

2. An animal holder comprising a tube the lower end of said tube provided with oppositely disposed diverging guides, a wire anchored at one end of the tube to form a loop and then extend into the other end of the tube said loop seated in said guides, a rigid rod slidable in the tube, means at the inner end of the rod to anchor the other end of the wire thereto, a lever, means for rockably mounting the lever on the tube, said tube having an opening through which one end of the lever passes, said one end of the lever having an opening through which the rod extends, spring means resting against the lever to cause the said one end of the lever to be urged inwardly of the tube, said rod having a threaded portion, a threaded member engaged in said one end of the lever to partially extend into the opening thereof for engaging the threaded portion of the rod to hold said rod in different adjusted positions, a block in the tube opposite to the opening therein against which the rod is urged when the lever is pressed by the spring means said wire anchoring means on the rod including a tapered nut, said rod end provided with peripheral threads and an opening, said nut threadedly connected with said threaded rod end.

In testimony whereof I affix my signature.

ODA AUGUSTA REEVES.